Sept. 8, 1953  E. A. VOLK  2,651,493
GAS TURBINE ENGINE STARTER
Filed April 13, 1951
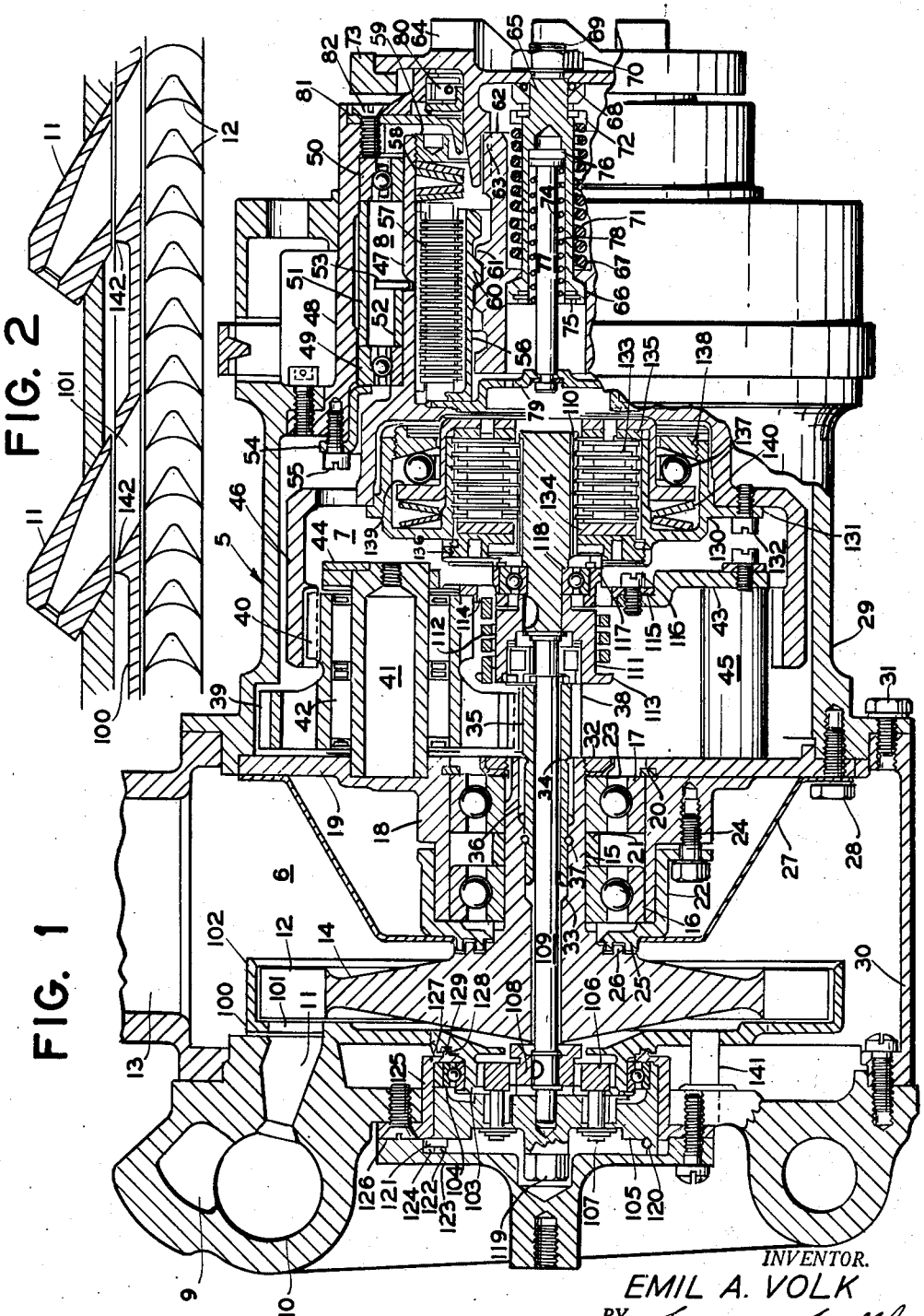
INVENTOR.
EMIL A. VOLK
BY
ATTORNEY Patented Sept. 8, 1953

2,651,493

UNITED STATES PATENT OFFICE 2,651,493

GAS TURBINE ENGINE STARTER

Emil A. Volk, Jr., Hasbrouck Heights, N. J., assignor to Bendix Aviation Corporation, Teterboro, N. J., a corporation of Delaware Application April 13, 1951, Serial No. 220,841

10 Claims. (Cl. 253—59)

The present invention relates to starters for starting internal combustion engines and more particularly to starters of the turbine type in which gases under pressure generated by igniting a cartridge containing an explosive mixture or a stored fluid are used as the motive power for the turbine.

The gas turbine or jet type of engine for aircraft use requires a higher cranking speed than that of the piston type internal combustion engine. The gas turbine must be cranked to something above the minimum speed at which the power output of the turbine exceeds that absorbed by the compressor, in order that the engine may take over and accelerate itself to idling speed. Further, the gas turbine requires a greater amount of power than that required to start the piston engine of comparable horsepower.

The turbine type starter, using a small turbine running at high speed connected through reduction gearing to the starter jaw, has been found suitable to provide the quick starts desirable for the gas turbine engine. The starter turbine is powered by expanding gases such as from a slow burning powder cartridge or gasoline and compressed air.

Usually a predetermined charge is ignited and the turbine wheel is subject to the pressure of the gas generated until the charge has been dissipated. In this connection, it is necessary to provide some means to prevent the turbine from overspeeding. Should the jaws fail to mesh or the engine start before the charge is dissipated, the speed of the turbine would rise above a safe value.

Various types of centrifugal devices have been utilized in attempts to limit the turbine speed. However, these devices have been mounted on the turbine shaft and the high speed of rotation has prevented any accuracy in the control.

In the present invention, the control means are actuated from the low speed end of the starter and comprise a clutch actuated by balls to move the cut-off plate to direct the flow of gas away from the turbine blades, a spring returns the cut-off plate back to its normal position upon the speed falling below the predetermined maximum. Further, the cut-off plate is so designed that upon it being moved to the cut-off position, the gas pressure tends to aid in moving the cut-off plate to the cut-off position.

An object of the invention is to provide an improved speed control for turbine type starters.

Another object of the invention is to provide an improved solid propellant type starter.

Another object of the invention is to provide an improved overspeed device for a starter.

Another object of the invention is to provide an improved arrangement for the cut-off plate and nozzles of a turbine.

Another object of the invention is to provide improved means for controlling the flow of gases in a turbine.

The above and other objects and features of the invention will appear more fully hereinafter from a consideration of the following description taken in connection with the accompanying drawing wherein one embodiment of the invention is illustrated by way of example.

In the drawing:

Figure 1 is a longitudinal sectional view of a starter embodying the invention.

Figure 2 is a detailed sectional view of the cut-off plate showing its relationship to the nozzles and turbine blades.

Referring now to Figure 1, there is indicated generally by the numeral 5 a starter comprising generally a turbine 6, gearing 7 and jaw mechanism 8.

Gases under pressure are supplied from a suitable source such as from a cartridge of explosives (not shown) through inlet 9 to turbine inlet chamber 10. From the inlet chamber 10, the gases expand through nozzles 11 and are directed against turbine blades 12. An exhaust port 13 permits the spent gases to escape. The turbine wheel 14 is integral with shaft 15 which is journaled in bearings 16 and 17.

The bearings 16 and 17 are supported by a cylindrical flange section 18 of wall 19. A lock ring 20, spacer 21 and a cup-shaped member 22 hold the bearings 16 and 17 in position. The lock ring 20 may also hold a seal 23 against the bearing 17. The member 22 is secured to the wall 19 by bolts 24. The member 22 has baffles 25 adapted to coact with baffles 26 on the turbine wheel 14 to provide a seal for the hot gases. A cover 27 surrounds the bearings 16 and 17 and is attached to the wall 19 by bolts 28 which also secure the wall 19 to housing 29 of the gearing section 7. The cover 27 serves to protect the bearing assembly from the hot gases and coacts with housing 30 to form an exhaust chamber. The housing 30 is secured to housing 29 by bolts 31.

The shaft 15 is secured in the bearing assembly by a lock nut 32. The shaft 15 has a counterbore portion 33 having internal splines 34. A sleeve 35 having splines 36 adapted to mesh with the splines 34 is secured in the counterbore portion 33 by a lock ring 37. The sleeve 35 has a splined portion 38 adapted to mesh with gear 39. The gear 39 is integral with gear 40 and is journaled on stub shaft 41 by bearings 42. The shaft 41 is carried by the wall 19 and the bearings 42 and gear 39—40 are secured on the shaft by a wall member 43 and retaining ring 44 supported by post 45 attached to the wall member 19 by any suitable means.

The gear 40 is adapted to mesh with ring gear 46. Integral with the ring gear 46 is a barrel 47 journaled in housing 48 by bearings 49 and 50. The bearings 49 and 50 are secured in the housing 48 by spacers 51 and 52, snap ring 53 and a retaining ring 54. The retaining ring 54 is secured to the housing 48 by screws 55.

The barrel 47 is connected to spline nut 56 by conventional clutch pack 57. A spring 58 forces the disc of the clutch pack 57 together. A ring nut 59 screw threadedly mounted in the open inner end of the barrel 47 is adapted to adjust tension of the spring 58 and the friction between the disc of the pack 57. The spline nut 56 has internal long lead splines 60 engaging mating splines 61 of screw shaft 62. The screw shaft 62 has a splined connection 63 to jaw member 64 for rotation therewith and axial movement relative thereto. A meshing rod 65 has a flange 66 behind a flange 67 of the screw shaft 62, a sealing ring 68 in a groove of a shoulder facing the member 64 and a portion 69 extending through the member 64 on which is fixed a nut 70 compressing the sealing ring 68 and holding the member 64 to the rod 65. A spring 71 in the shaft 62 and through the intermediary of which the shaft 62 acts when it pushes the jaw member 64 for engagement with an engine jaw element (not shown), is disposed between the flange 67 and a spring backing ring 72 on the rod 65. The jaw member 64 has a flange 73 to provide sufficient mass to cause the screw shaft 62 to be moved axially by the spline nut 56 thereby moving the jaw member 64 into an engine engaging position. A return spring 74 is disposed between a spring retaining ring 75 and a shoulder 76 on a rod 77 extending into a counterbore portion 78 of the mesh rod 65. The rod 77 is anchored by a flanged member 79. An oil seal 80 surrounds the shank portion of the jaw 64 and is positioned by end plate 81. The end plate 81 is secured to the housing 48 by screws 82.

The novel feature of the invention resides in the overspeed control. A cut-off plate 100 is disposed between the nozzles 11 and the turbine blades 12. The cut-off plate 100 has openings 101 normally in line with the nozzles 11 and terminates in a flanged portion 102 extending over the ends of the turbine blades 12. The cut-off plate 100 has a hub portion 103 journaled in bearings 104. The bearings 104 are supported by end plate 105. The hub 103 has internal splines adapted to mesh with gears 106. The gears 106 are mounted on stub shafts 107 carried by the plate 105. The gears 106 mesh with a pinion gear 108 carried by a shaft 109. The shaft 109 extends through the turbine wheel 14, sleeve 35 and terminates in a splined section 110. A hub member 111 is keyed to the shaft 109. A spring 112 surrounds the hub member 111 and has one end secured to a flange 113 on the hub member 111. The other end of the spring 112 is secured in a slot 114 in an extension 115 of wall member 43. The extension 115 is secured to the wall member 43 by screws 116 or any other conventional means. The extension 115 also has a flange 117 for supporting bearing 118.

The spring 112 is wound in a direction to bias the cut-off plate 100 to the normal open position. Tension on the spring 112 may be adjusted by means of a nut-like projection 119 on the end plate 105 to facilitate rotating the plate 105. A snap ring 120 having outward extending ends 121, extending through an opening 122 in a flange 123 of the plate 105 is adapted for positioning the ends 121 in any of a plurality of slots 124 in a ring-like member 125. The ring-like member 125 is secured to the chamber 10 by screws 126. The member 125 also has a flange 127 extending radially inward over the bearing 104. The flange 127 has baffles 128 adapted to coact with baffles 129 on cut-off plate 100 to provide a seal for the gases.

A U-shaped member 130 having an outwardly extending flange 131 is secured to the barrel 47 by screws 132. The member 130 is connected to the shaft 109 through clutch pack 133. One set of discs of the clutch pack 133 is splined to the member 130 and the other set to the splined end 110 of the shaft 109. The clutch pack 133 is disposed between a backing plate 134 and a pressure plate 135. The backing plate 134 is secured in position by a ring nut 136 which permits adjustment of the clutch pack due to wear of the discs. Pressure is applied to the pressure plate 135 by balls 137 actuated by centrifugal force against a wedge shaped ring 138 to urge clutch pack compression piece 139 against the bias of spring 140 to compress the clutch pack. The ring 138 is threaded into the member 130 to permit adjustment.

In operation, the turbine wheel 14 is driven by gases under pressure directed against the turbine blade 12 by the nozzles 11 whence they exhaust through the exhaust ports 13. The turbine wheel drives the reduction gearing through the shafts 15 and 35. The output of the reduction gearing is connected to rotate the barrel 47 which is connected by the clutch pack 57 to rotate the starter jaw 64 through the conventional spline nut 56, screw shaft 62 and mesh rod 65. The member 130 carrying the centrifugally responsive balls 137 is rotatably connected to the barrel 47. Under a predetermined speed, the springs 140 bias the clutch pack 133 into a disengaged position.

As the turbine reaches a maximum predetermined speed, the balls 137 move outward and roll up on the wedge shaped ring 138. As the balls 137 move outward, the clutch compression member 139 is moved against the bias of spring 140 and compresses the clutch pack 133 which yieldably connects the barrel 47 to the shaft 109. The shaft 109 is rotated by the barrel 47 against the bias of return spring 112 and rotates the cut-off plate 100 to move the opening 101 away from the nozzles 11. A stop 141 limits the travel of the cut-off plate 100. The cut-off plate 100 has projections 142 (see Figure 2) which when initially moved into the nozzle stream act so as to augment the transmitted rotation from the clutch pack. Upon the cut-off plate 100 reaching the cut-off position and further rotation prevented by the stop 141, the clutch pack 133 will again slip due to the higher torque imposed thereon. In the cut-off position, the gases are deflected around the turbine blades and pass out through the ports 13.

Upon the turbine slowing below the predetermined speed, the balls 137 are forced down the wedge ring 138 by the spring 140 removing the pressure from the clutch pack 133. The return spring 112 unwinds to move the orifice plate 100 to place the openings 101 in front of the nozzles 11.

Adjusting the wedge ring 138 in or out varies the speed at which the clutch pack 133 engages as it varies the distance the compression piece 139 must be moved by the balls 137 before it compresses the clutch pack 133 to an engaging position. End play in the clutch pack 133 may be controlled so as to maintain the preselected engagement speed as wear takes place by adjusting the ring nut 136.

Thus, the centrifugal control is located on the low speed end of the starter where it operates at a lower speed and can be controlled within narrow limits. Further, it permits a wider tolerance in the parts thereby facilitating manufacture.

Although only one embodiment of the invention has been illustrated and described, various changes in the form and relative arrangement of the parts, which will now appear to those skilled in the art, may be made without departing from the scope of the invention.

What is claimed is:

1. An engine starter comprising the combination of a gas turbine, inlet nozzles and an outlet through which motive gas is respectively admitted to and discharged from the turbine, jaw rotating mechanism, reduction gearing interconnecting said turbine and said jaw rotating mechanism, a cut-off plate interposed between said inlet nozzles and said turbine and having a closed and an open position, spring means for biasing said cut-off plate to its open position, means including a centrifugally operated clutch for yieldably connecting said cut-off plate to said jaw rotating mechanism upon the speed of rotation of said jaw rotating mechanism exceeding a predetermined rate to move said cut-off plate to its closed position thereby interrupting the flow of gas to said turbine.

2. An engine starting apparatus comprising the combination of a gas turbine, an inlet and an outlet through which motive gas is respectively admitted to and discharged from the turbine, jaw engaging and rotating mechanism, reduction gearing interconnecting said turbine to said jaw mechanism, a cut-off plate interposed between said inlet and said turbine and having opening normally in line with said inlet, means responsive to the speed of rotation of said jaw mechanism to rotate said cut-off plate to move said openings out of line with said inlet upon said speed exceeding a predetermined rate thereby to by-pass said gas from said turbine.

3. In an engine starter of the turbine type having a turbine wheel, jaw mechanism and reduction gearing interconnecting said turbine wheel and jaw mechanism; an over-speed device comprising a cut-off plate for controlling the flow of gases to said turbine wheel, said plate being normally biased to direct the flow of gases to said turbine wheel, means including a disc pack clutch normally biased in a disengaged position for connecting said cut-off plate to the low speed output of said reduction gearing, and ball actuated means responsive to the speed of rotation of said low speed output to actuate said disc pack clutch to an engaging position upon said speed exceeding a predetermined maximum to move said plate to direct the flow of gases away from said turbine wheel.

4. In an engine starter of the type having a turbine, jaw mechanism, and reduction gearing interconnecting said turbine and jaw mechanism, the combination comprising nozzle means for directing the flow of gases, a control plate having opening therein to permit the passage of the gases to said turbine, means for biasing said control plate so that said openings are normally in register with said nozzle means, speed responsive means for overcoming said bias and moving said control plate so that said openings are out of register with said nozzle means, said last means including a disc pack clutch for connecting said control plate to the low speed output of said reduction gearing and a ball actuated pressure member responsive to said low speed output to bias said clutch pack into frictional engagement upon said speed exceeding a predetermined maximum.

5. In an engine starter having a turbine, jaw mechanism, reduction gearing interconnecting said turbine and jaw mechanism, and inlet and outlet ports through which motive gas is respectively admitted and discharged from the turbine, the improvement comprising a cut-off plate interposed between the inlet and the turbine and angularly movable to deflect the motive gas from the turbine, means including a disc pack clutch normally biased in a disengaged position for connecting said cut-off plate to the low speed side of said reduction gearing, and speed responsive means for biasing said clutch into frictional engagement upon the speed of said low speed side exceeding a predetermined maximum.

6. The combination as set forth in claim 5 and including means for adjusting said biasing means to select a predetermined maximum speed.

7. A gas turbine starter comprising the combination of a rotor, one or more inlet nozzles, an outlet, jaw mechanism, reduction gearing interconnecting said rotor and said jaw mechanism, a cut-off plate interposed between said nozzles and said rotor, said cut-off plate having apertures therein normally biased to be in line with said nozzles, means including a shaft and a disc pack clutch for connecting said plate to the output side of said reduction gearing, said disc pack being biased normally in a disengaged position, means including a centrifugally responsive member for overcoming said bias and urging said disc pack into frictional engagement upon the speed of said output side exceeding a predetermined amount to move said apertures out of line with said nozzles, and means to limit the travel of said plate.

8. An engine starter comprising the combination of a gas turbine, inlet nozzles and an outlet through which motive gas is respectively admitted to and discharged from the turbine, jaw mechanism, reduction gearing interconnecting said turbine and said jaw mechanism, a cut-off plate interposed between said nozzles and said turbine, said cut-off plate having apertures therein disposed opposite said nozzles, speed responsive means adapted to rotate said cut-off plate to deflect said motive gases from said nozzles, said means including a disc pack clutch normally biased to an open position, a centrifugally operated pressure plate disposed on the low speed side of said reduction gearing and operable to overcome said bias and urge said disc pack into frictional engagement upon the speed of said gearing exceeding a predetermined maximum, and means for limiting the movement of said plate.

9. The combination as set forth in claim 8 and including projections on said plate responsive to the motive gas to coact with said speed responsive means to rotate said plate.

10. The combination as set forth in claim 8 and including means to return said plate to a position wherein said apertures are disposed opposite said nozzles upon the speed of said gearing falling below said predetermined maximum.

EMIL A. VOLK, Jr.

References Cited in the file of this patent

UNITED STATES PATENTS

| Number | Name | Date |
|---|---|---|
| 2,154,572 | Lansing | Apr. 18, 1939 |
| 2,559,006 | Clapham | July 3, 1951 |